R. H. RICE.
TURBINE DRIVEN APPARATUS.
APPLICATION FILED FEB. 27, 1908.
937,467.
Patented Oct. 19, 1909.
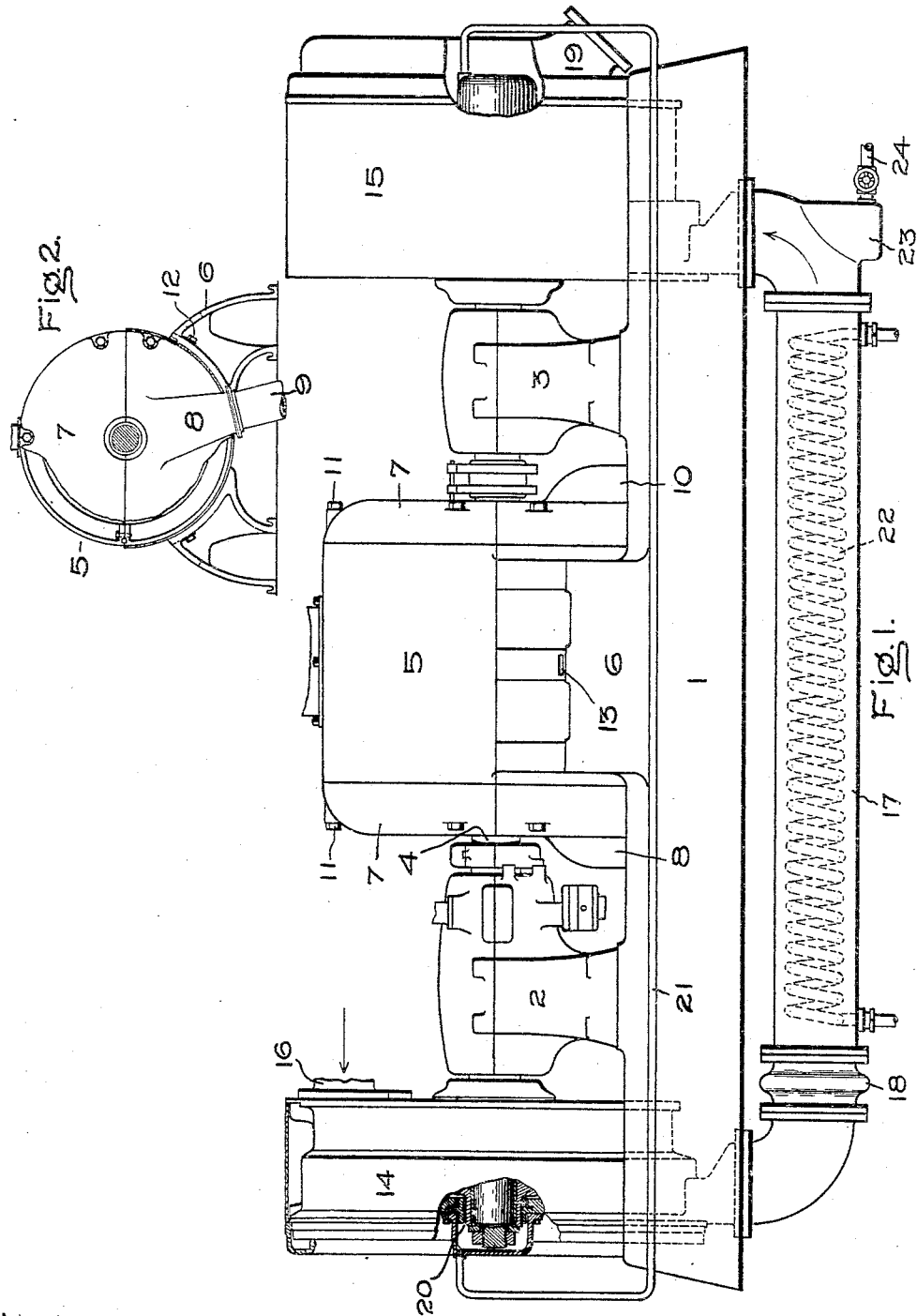
Witnesses:
Marcus L. Byng.
J. Ellis Glen
Inventor
Richard H. Rice
By Albert G. Davis
Att'y

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

TURBINE-DRIVEN APPARATUS.

937,467.  Specification of Letters Patent.  Patented Oct. 19, 1909.

Application filed February 27, 1908. Serial No. 418,066.

*To all whom it may concern:*

Be it known that I, RICHARD H. RICE, a citizen of the United States, residing at Lynn, county of Essex, State of Massachusetts, have invented certain new and useful Improvements in Turbine-Driven Apparatus, of which the following is a specification.

The present invention relates to turbine-driven apparatus, and more especially to those cases where the turbine is direct-connected to the moving element of an electric generator.

The object of the present invention is to so construct and arrange the parts that they are readily accessible, and further to balance the rotating turbine elements against end-thrust.

In the accompanying drawing is shown one of the embodiments of my invention wherein—

Figure 1 is a view in side elevation of a turbine and generator driven thereby, and Fig. 2 is a view in end elevation of the electric generator.

1 indicates the bed-plate of the machine and 2 and 3 are pillow-blocks mounted thereon to support the bearings for the main shaft 4. Between the pillow-blocks is an electric generator 5, the casing for which is cylindrical in outline and is divided in an axial plane into two principal parts, an upper and a lower. The periphery of the generator is finished either all over or at suitable places, and the lower half rests on a saddle 6 comprising two principal parts located on opposite sides of the bed-plate. The inner surface of the saddle is finished concentric with the axis of the main shaft as is also the generator casing.

The casing is seated on the saddle and is bolted thereto to prevent turning during normal operation. On the ends of the generator are heads 7 which are bolted to the casing. The lower half of each head is, or may be, provided with a conduit 8 that is connected by a pipe 9 with a ventilating system. Air enters by one pipe, passes through the ducts in the field and armature, or both, and escapes as by the conduit 10 and pipe attached to the other head.

When it is desired to get at the upper half of the generator the principal electrical connections are broken, and the head securing bolts 11 are removed from the upper half and those of the lower half backed off slightly. The bolts uniting the upper and lower parts are then removed after which the top can be removed by a crane in the usual way to expose the parts. Assuming that it is desired to inspect the lower half of the generator, the electrical connections are broken, the bolts 12 clamping the generator to the saddle are removed, a bar is inserted in one of the notches 13, and the casing rotated step-by-step around the shaft while resting on the saddle until what was the bottom becomes the top, after which the bolts uniting the parts are released when the parts may be separated as before. The parts can be reassembled by reversing the operations. By reason of this construction both parts of the stationary element of the generator can be removed without disturbing the rotating element thereof, or the alinement of the shaft and bearings, or the turbine, or any of its piping,—features that are of great practical advantage in the construction and operation of apparatus of the character described. By removing the upper half of the casing and slowly revolving the rotating member of the generator, it can be inspected or worked on without disturbing the lower part of the casing or the turbine.

Mounted at opposite ends of the shaft are parts 14 and 15 of a turbine. That on the left is the high pressure end and that on the right the low pressure end. The casings of the turbine parts are each supported by the projecting ends of the bed-plate. The rotating bucket wheels are mounted directly on the ends of the shaft outside of the bearings. That is to say, they are overhung, and the weight thereof tends to balance the weight of the revolving element of the generator.

Steam enters the high pressure end of the turbine by the chest 16, which, with the valve mechanism, overhangs the pillow-block 2, or in other words, is in-board. This is advantageous because it decreases the overall length of the machine. Steam exhausting from the first stage or stages of the machine enters the conduit 17 located under the base and discharges into the low pressure stage or stages. Included in this conduit is an expansion joint or coupling 18 to take care of expansion and contraction of the parts.

The exhaust is carried off by one or more conduits 19 to a condenser or to the atmosphere.

The steam may flow in the same or in opposite directions in the parts of the turbine, or it may flow in one direction in one-half of the machine and in the opposite direction in the other half. This latter arrangement is preferable where the wheel buckets are so shaped that there is a material end thrust on the shaft. By arranging the steam-flow to take place in opposite directions the thrust of one set of buckets can be made to balance or nearly balance that of the other. There is, however, an unbalanced relation of parts which is not taken care of by the arrangement referred to, and this is the unbalance of the parts due to the difference in pressure to which the ends of the shaft and wheel hubs and possibly adjacent parts are exposed, it being noted that the shaft ends do not project through the casings, thereby avoiding the use of a certain number of packings. The pressure differences to which the shaft ends are exposed vary with the load, sometimes being comparatively small and at other times comparatively large. Suitable packings 20 are provided for the revolving elements. They may surround the shaft or the wheel hub as desired. These packings should be fairly well fitted, but especial care is unnecessary. Any steam leaking past the packing enters a chambered bonnet attached to or formed on the end wall of the casing. The chambers in the bonnets at opposite ends are connected by the equalizing conduit 21 that equalizes the pressures therein. This conduit may be located at any convenient point where it will be out of the way. Any difference in pressure, due to leakage around the packings, is immediately equalized and therefore the thrust is neutralized.

The two turbine elements which drive the main shaft constitute, in certain broad aspects of my invention, a driving element which for utility and convenience is divided into two parts, one of which is at or near one end of the shaft and the other at or near the opposite end. In the present embodiment of the invention the total area of one of the shaft ends and a wheel hub is exposed to a different pressure from that on the total area of the other shaft end and the wheel hub carried thereby, which difference is equalized by the conduit 21. Under some conditions the exposed areas may be changed from those shown, but the equalizing arrangement will be the same. The exposed ends or hubs or parts, whatever they may be, should correspond in area as nearly as possible, assuming that they are the only parts which have a tendency to be unbalanced, and thus prevent an endwise thrust because the pressures thereon are equal.

The closing in of the shaft ends by bonnets thereby cutting off all escape of the working fluid, either as a vapor or as a liquid, is of especial importance where the vapor of some fluid other than water is employed as a motive power agency, which fluid is either expensive or is liable to create damage when released, or both.

By inserting a heating coil 22 in the horizontal conduit 17 and supplying it with gases or with steam at a temperature above that of the steam in the conduit, I can reheat or even superheat the latter by any desired amount. The gases may pass through the heating coil in a direction against that of the flow of steam in the conduit 17 or they may flow in the same direction, both of which arrangements possess certain advantages. At one end of the conduit 17 is a pocket 23 in which water may be collected and drained off by the valved conduit 24.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is,—

1. In combination, a shaft having end portions which are shut off from the main supply of motive fluid and are exposed to different pressures which tend to move the shaft longitudinally, driving elements mounted on the shaft, casings for the elements, conduit means for conveying motive fluid to and from the casings and elements, and other conduit means which equalize the pressures on said end portions of the shaft.

2. In combination, a shaft, turbine elements mounted thereon to drive it, the ends of the shaft being inclosed in the casing of said elements and exposed to different pressures, means admitting motive fluid to the said elements and receiving exhaust therefrom, and means for equalizing the pressures on the shaft ends.

3. In combination, a shaft, turbine elements mounted on the ends thereof to drive it, casings which inclose the elements and also the ends of the shafts, one or more packing devices which restrict the passage of motive fluid to the ends of the shaft, a conduit connecting the regions around the ends of the shaft to equalize the pressures and reduce the tendency of the shaft to endwise movement, and means admitting motive fluid to the elements and conveying the exhaust therefrom.

4. In combination, a shaft having ends to which the motive fluid has difficult access, a driving means mounted on the shaft, a conduit admitting motive fluid to the driving means, a conduit receiving the exhaust therefrom, and a separate conduit which has no direct connection with the source of supply and connects the regions at the ends of the shaft to reduce the tendency of the shaft to endwise movement.

5. In combination, a shaft, driving elements with their hubs mounted on the ends thereof, means which restrict the passage of motive fluid to the ends of the shaft and to one side of the hubs, conduits for admitting motive fluid to the elements and receiving the exhaust therefrom, and a separate means that connects and equalizes the fluid pressures at the ends of the shaft and the hubs of the driving elements.

6. In combination, a shaft, bearings therefor, driving elements for the shaft located on the ends thereof outside of the bearings, casings for the elements, a driven machine having a rotating member mounted on the shaft between said bearings and a normally stationary member coöperating with the rotating member, the weight of the rotating member balancing to a greater or less extent that of said elements, a support for the stationary member on which it may be turned about the rotating member, means for normally securing the stationary member to its support, and conduits for conveying motive fluid to and from the driving elements.

7. In combination, a shaft, bearings therefor, driving elements for the shaft located on the ends of said shaft and outside of the bearings, casings therefor, a driven member the weight of which balances to a greater or less extent that of said elements, conduits for conveying motive fluid to and from said driving elements, and a conduit which connects the regions around the ends of the shaft and is independent of the supply and exhaust conduits for balancing the tendency of the shaft to move endwise.

8. In combination, a bed-plate, pillow-blocks mounted thereon, a driving shaft supported by said blocks, a prime mover mounted on the shaft beyond the pillow-blocks, a driven member mounted on the shaft between the pillow-blocks, and a saddle that supports the casing of the driven member and on which it may be turned about the shaft axis without disturbing the shaft and pillow-blocks.

9. In combination, a bed-plate, pillow-blocks mounted thereon, a driving shaft supported by said blocks, prime movers mounted on the ends of the shaft outside of the pillow-blocks, a driven member mounted on the shaft between the pillow-blocks, a casing therefor, and a saddle on the bed-plate that supports the casing and on which it is angularly movable.

10. In combination, a bed-plate, pillow-blocks mounted thereon, a driving shaft supported by said blocks, prime movers mounted on the ends of the shaft outside of the pillow blocks, a driven member mounted on the shaft between the pillow-blocks, a casing therefor which is divided into upper and lower portions, and a saddle on the bed-plate that supports the under portion of the casing and on which the whole casing may be turned about the shaft axis.

11. In combination, a bed-plate, pillow-blocks mounted thereon, a driving shaft supported by said blocks, turbine elements mounted on the ends of the shaft, casings therefor which are supported by the bed-plate, a conduit connecting the casings and conveying motive fluid from one to the other, an expansion coupling in said conduit, other conduits admitting motive fluid to the elements and conveying the exhaust therefrom, and a driven member mounted on the shaft between the pillow-blocks.

12. In combination, a bed-plate, pillow-blocks mounted thereon intermediate its ends, a driving shaft supported by the pillow-blocks, high and low pressure turbine rotors mounted on the ends of the shaft beyond the pillow-blocks, casings for the rotors which are supported by the bed-plate and are provided with inlet and outlet openings for the motive fluid, a conduit admitting motive fluid to the inlet opening of the high pressure casing, a conduit conveying motive fluid from the outlet of the high pressure casing to the inlet of the low pressure casing which is provided with an expansion coupling, a heating coil in said last mentioned conduit, a conduit for conveying the exhaust away from the outlet opening of the low pressure casing, and a driven member mounted on the shaft between the pillow-blocks.

In witness whereof, I have hereunto set my hand this thirteenth day of February, 1908.

RICHARD H. RICE.

Witnesses:
JOHN A. MCMANUS, Jr.,
ALEX. F. MACDONALD.